US011539719B2

(12) United States Patent
Chopra et al.

(10) Patent No.: US 11,539,719 B2
(45) Date of Patent: Dec. 27, 2022

(54) TARGET AWARE ADAPTIVE APPLICATION FOR ANOMALY DETECTION AT THE NETWORK EDGE

(71) Applicant: BANK OF AMERICA CORPORATION, Charlotte, NC (US)

(72) Inventors: Narendra Chopra, New Delhi (IN); Nitin Saraswat, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 346 days.

(21) Appl. No.: 16/895,481

(22) Filed: Jun. 8, 2020

(65) Prior Publication Data
US 2021/0385233 A1 Dec. 9, 2021

(51) Int. Cl.
*H04L 9/40* (2022.01)
*G06N 20/00* (2019.01)
*G06F 8/61* (2018.01)
*G06F 16/953* (2019.01)

(52) U.S. Cl.
CPC ............ *H04L 63/1416* (2013.01); *G06F 8/63* (2013.01); *G06F 16/953* (2019.01); *G06N 20/00* (2019.01)

(58) Field of Classification Search
None
See application file for complete search history.

(56) References Cited

U.S. PATENT DOCUMENTS

| 2016/0189041 | A1* | 6/2016  | Moghtaderi  | G06N 5/04     |
|              |     |         |             | 706/12        |
| 2017/0289184 | A1  | 10/2017 | C et al.    |               |
| 2018/0096261 | A1* | 4/2018  | Chu         | G06N 20/20    |
| 2018/0114334 | A1* | 4/2018  | Desai       | G06V 10/82    |
| 2018/0253665 | A1* | 9/2018  | Okanohara   | G06N 20/00    |
| 2018/0284758 | A1* | 10/2018 | Celia       | G05B 13/028   |
| 2019/0324438 | A1* | 10/2019 | Celia       | G05B 19/41865 |
| 2019/0324439 | A1* | 10/2019 | Celia       | G05B 19/41865 |
| 2020/0304530 | A1* | 9/2020  | Savalle     | H04L 41/142   |

* cited by examiner

*Primary Examiner* — Joseph P Hirl
*Assistant Examiner* — Hassan Saadoun
(74) *Attorney, Agent, or Firm* — Moore & Van Allen PLLC; James C. Edwards

(57) ABSTRACT

Customized DL anomaly detection models and generated and deployed on disparate edge devices. Configuration-related information is fetched from the edge devices and, based on the configuration/capabilities of the edge device, at least one primary deep learning-based anomaly detection model is selected, which are customized based on the configuration/capabilities of the edge device. Customization involves limiting the volume of the predictors/variables and optimizing the iterations used to determine anomalies and/or make predictions. The customized models are subsequently packaged in edge device-specific formats, such as a customized set of binaries in C language or the like. The resulting customized DL anomaly detection application is subsequently deployed to the edge device where it is executable without the need for specialized hardware or communication with network entities, such as cloud nodes or servers.

20 Claims, 3 Drawing Sheets

TARGET AWARE ADAPTIVE APPLICATION FOR ANOMALY DETECTION AT THE NETWORK EDGE

FIELD

The present invention relates to computing security and, more specifically, a programmatic solution for generating and deploying customized Deep Learning (DL) anomaly detection models for edge devices.

BACKGROUND

With the increased usage of edge devices, such as mobile devices, wearable devices, Internet-of Things (IoT) devices and the like, the amount of usable data generated by such devices is ever growing. As such, the need to analyze this data to classify it as anomalous and non-anomalous becomes critical as a means of preventing the occurrence of wrong-doings by nefarious entities. In this regard, edge devices benefit from anomaly detection models or application that are capable of detecting anomalous data and, in response drawing inferences or making predictions related to the anomalous data.

Currently computationally complex Deep Learning (DL)-based anomaly detection models are implemented on edge device, which in most instances require network communication with a data center/server or cloud node in order to respond to the occurrence of an event. In addition, due to their complexity, some of these DL-based anomaly detection models require special hardware to execute the models. However, many edge devices, especially those with minimal resources, may be incapable of executing such computationally complex DL-based anomaly detection models.

In addition, as edge devices become more prevalent, so too does the diversity of usable data that is generated by the edge devices. As a result, it becomes difficult, if not impossible, to deploy a single comprehensive DL-based anomaly detection model/application that would be capable of detecting anomalies across all or most edge devices.

Therefore, a need exists to develop systems, methods, computer program products and the like for generating and deploying anomaly detection models that are capable of deployment on all edge devices regardless of software, hardware and/or firmware configuration. Moreover, the desired systems, methods, computer program products and the like should provide an anomaly detection model that is capable of executing on the edge devices absent the need for network communication with a data center/server and/or a cloud node. Further, the desired systems, methods, computer program products and the like should provide an anomaly detection model/application that is capable of executing on the edge devices absent the need for specialized hardware.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for systems, computer-implemented methods, computer program products and the like for generating and deploying customized DL anomaly detection models on disparate edge devices. As previously discussed, edge devices, such as mobile devices, wearable devices, IoT devices and the like vary in terms of hardware, software and/or firmware configuration/capabilities. As such, the present invention provides for customizing anomaly detection models for each of the edge devices based on the specific configuration/capabilities of the edge device.

Specifically, the present invention provides for fetching configuration-related information from edge devices and, based on the information, selecting at least primary DL anomaly detection model which is then converted (i.e., customized) based on the configuration/capabilities of the specific edge device. Customization includes reducing the volume of variables/predictors from the primary anomaly detection models and optimizing processing iterations for identifying anomalies. Reducing the volume of variables/predictors may include selecting only those variables/predictors that influence an outcome/prediction and provide a requisite level of predictions when encountering previously unknown data. Iterations may be optimized by limiting variables/predictors to only those that do not require external data (i.e., network communication with a cloud node or a data center/server).

Once the anomaly detection models have been customized, the model(s) are translated into a format that is executable on the specific edge device. For example, the customized DL anomaly detection is packaged as an edge device-specific set of binaries in C programming language, which are subsequently deployed on the edge device.

Thus, the present invention provides for customizing anomaly detection models based on the specific configuration of the targeted edge device. The customized model is a pared-down, so called "lightweight" version of a primary anomaly detection model, which is capable of execution on the edge device absent a need be executed using specialized hardware or to retrieve data from a cloud or data center. As result, anomalies are detected on the edge device and predictions result based solely on the attributes captured on the edge device and, as a result, the processing time for such predictions/outcomes is greatly reduced.

A system for generating and deploying customized Deep Learning (DL) anomaly detection models on edge devices comprises first embodiment of the invention. The system includes a plurality of edge devices deployed throughout a distributed communication network. The system further includes one or more primary DL anomaly detection models, each primary DL anomaly detection model configured to detect anomalies occurring at a device and make predictions based on the detected anomalies. In addition, the system includes a computing platform including a memory and at least one processing device in communication with the memory. The memory stores instructions that are executable by the one or more processing device. The instructions are configured to communicate with the edge devices to retrieve information from each edge device that identifies configuration of a corresponding edge device. The instructions are further configured to select, for each of the edge devices based on the information, at least one primary DL anomaly detection model from amongst the one or more primary DL anomaly detection models and convert, for each of the edge devices based on the device configuration information, the selected the one or more primary DL anomaly detection models to one or more customized DL anomaly detection models that are specific to a corresponding one of the edge devices. The instructions are further configured to translate, for each of the edge devices, the one or more customized DL anomaly detection models to a format executable on the corresponding one of the edge devices, and deploy, on each of the edge devices, the one or more translated and customized DL anomaly detection models for execution on the corresponding one of the edge devices.

In specific embodiments of the system, the one or more customized DL anomaly detection models are executed on the corresponding one of the edge devices to locally detect anomalies and locally provide predictions related to the anomalies absent (i) network communication with a cloud network and a data center, and/or (ii) a requirement for implementing hardware on the corresponding one of the edge devices that is specifically designed for executing DL anomaly detection models.

In further specific embodiments of the system, the instructions configured to communicate with the edge devices to retrieve information that identifies configuration of a corresponding edge device are further configured to communicate with the edge devices to retrieve make and model information related to the corresponding edge device, and, in response, access a make and model listing to identify at least one of software, hardware, firmware and architecture information associated with the make and model information of the corresponding edge device.

In additional specific embodiments of the system, the instructions configured to convert the selected the one or more primary DL anomaly detection models to one or more customized DL anomaly detection models are further configured to reduce a volume of predictors in the one or more primary DL anomaly detection models by selecting predictors based on at least one of (i) an ability to influence a prediction, (ii) providing a predetermined level of prediction when encountering previously unseen anomaly-detection related data, (iii) bias versus variance tradeoff and (iv) an ability for cross validation. In related embodiments of the system, the instructions configured to convert the selected at least one primary DL anomaly detection model to one or more customized DL anomaly detection models are further configured to optimize anomaly detection iterations in the one or more primary DL anomaly detection modules.

In further specific embodiments of the system, the instructions configured to translate the one or more customized DL anomaly detection models to a format executable on the corresponding one of the edge devices are further configured to translate the one or more customized DL anomaly detection models to a customized set of binaries in C computing language. In related embodiments of the system, the instructions configured to translate the one or more customized DL anomaly detection models to a format executable on the corresponding one of the edge devices are further configured to build an edge device-specific installer that is configured to translate the one or more customized DL anomaly detection models to a customized set of binaries in C computing language.

Moreover, in specific embodiments of the system, the plurality of edges devices include, but are not limited to, wearable communication devices, mobile communication devices, personal computing devices, and routers. In additional embodiments of the system, the customized DL anomaly detection models include, but are not limited to, cross browser extensions built using JavaScript, mobile applications, operating system-level applications and executable C codes.

A computer-implemented method for generating and deploying customized Deep Learning (DL) anomaly detection models on edge devices defines second embodiments of the invention. The method is executed by one or more computing device processors. The method includes communicating with a plurality of edge devices to retrieve information from each edge device that identifies configuration of a corresponding edge device. The method further includes selecting, for each of the edge devices based on the information, at least one primary DL anomaly detection model from amongst the one or more primary DL anomaly detection models and converting, for each of the edge devices based on the device configuration information, the selected at least one primary DL anomaly detection model to one or more customized DL anomaly detection models that are specific to a corresponding one of the edge devices. In addition the method further includes translating, for each of the edge devices, the one or more customized DL anomaly detection models to a format executable on the corresponding one of the edge devices, and deploying, on each of the edge devices, the one or more translated and customized DL anomaly detection models for execution on the corresponding one of the edge devices.

In specific embodiments of the computer-implemented method, the one or more customized DL anomaly detection models are executed on the corresponding one of the edge devices to locally detect anomalies and locally provide predictions related to the anomalies absent (i) network communication with a cloud network and a data center, and (ii) a requirement for implementing hardware on the corresponding one of the edge devices that is specifically designed for executing DL anomaly detection models.

In further specific embodiments of the computer-implemented method, communicating with the edge devices to retrieve information that identifies configuration of a corresponding edge device further comprises communicating with the edge devices to retrieve make and model information related to the corresponding edge device, and, in response, accessing a make and model listing to identify at least one of software, hardware, firmware and architecture information associated with the make and model information of the corresponding edge device.

In still further specific embodiments of the computer-implemented method, converting the selected at least one primary DL anomaly detection model to one or more customized DL anomaly detection models further comprises reducing a volume of predictors in the one or more primary DL anomaly detection models by selecting predictors based on at least one of (i) an ability to influence a prediction (ii) providing a predetermined level of prediction when encountering previously unseen anomaly-detection related data, (iii) bias versus variance tradeoff, and (iv) an ability for cross validation, and/or optimizing anomaly detection iterations in the one or more primary DL anomaly detection modules.

In additional specific embodiments of the computer-implemented method, translating the one or more customized DL anomaly detection models to a format executable on the corresponding one of the edge devices further comprises building an edge device-specific installer, and implementing the edge device-specific installer to translate the one or more customized DL anomaly detection models to a customized set of binaries in C computing language.

A computer program product including a non-transitory computer-readable medium defines third embodiments of the invention. The computer-readable medium includes a first set of codes for causing a computer processor to communicate with a plurality of edge devices to retrieve information from each edge device that identifies configuration of a corresponding edge device. Additionally, the computer-readable medium includes a second set of codes for causing a computer processor to select, for each of the edge devices based on the information, at least one primary DL anomaly detection model from amongst one or more primary DL anomaly detection models. Further, the computer-readable medium includes a third set of codes for causing a computer processor to convert, for each of the edge devices based on the device configuration information, the selected at least one primary DL anomaly detection model to one or more customized DL anomaly detection models that are specific to a corresponding one of the edge devices. In addition, the computer-readable medium includes a fourth set of codes for causing a computer processor to translate, for each of the edge devices, the one or more customized DL anomaly detection models to a format executable on the corresponding one of the edge devices. Moreover, the computer-readable medium includes a fifth set of codes for causing a computer processor to deploy, on each of the edge devices, the one or more translated and customized DL anomaly detection models for execution on the corresponding one of the edge devices.

In specific embodiments of the computer program product, the one or more customized DL anomaly detection models are executed on the corresponding one of the edge devices to locally detect anomalies and locally provide predictions related to the anomalies absent (i) network communication with a cloud network and a data center, and (ii) a requirement for implementing hardware on the corresponding one of the edge devices that is specifically designed for executing DL anomaly detection models.

In other specific embodiments of the computer program product, the first set of codes is further configured to cause the computer processor to communicate with the edge devices to retrieve make and model information related to the corresponding edge device, and access a make and model listing to identify at least one of software, hardware, firmware and architecture information associated with the make and model information of the corresponding edge device.

In still further specific embodiments of the computer program product, the third set of codes is further configured to cause the computer processor to reduce a volume of predictors in the one or more primary DL anomaly detection models by selecting predictors based on at least one of (i) an ability to influence a prediction (ii) providing a predetermined level of prediction when encountering previously unseen anomaly-detection related data, (iii) bias versus variance tradeoff, and (iv) an ability for cross validation, and optimize anomaly detection iterations in the one or more primary DL anomaly detection modules.

In additional specific embodiments of the computer program product, the fourth set of codes is further configured to build an edge device-specific installer, and implement the edge device-specific installer to translate the one or more customized DL anomaly detection models to a customized set of binaries in C computing language.

Thus, according to embodiments of the invention, which will be discussed in greater detail below, the present invention provides for generating and deploying customized DL anomaly detection models on disparate edge devices. Specifically, the invention fetches configuration-related information from the edge devices and, based on the configuration/capabilities of the edge device, selects at least one primary DL anomaly detection model which is then customized based on the configuration/capabilities of the edge device. Customization involves limiting the volume of the predictors/variables and optimizing the iterations used to determine anomalies and/or make predictions. Once the models have been customized the invention provides for packaging the customized models in edge device-specific formats, such as a customized set of binaries in C language or the like. The resulting customized DL anomaly detection application is subsequently deployed to the edge device where it is executable without the need for specialized hardware or communication with network entities, such as cloud nodes or servers. Thus, the resulting customized DL anomaly detection application is capable fully localized execution, in which, only those attributes captured on the edge device are used to determine anomalies and/or make predictions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
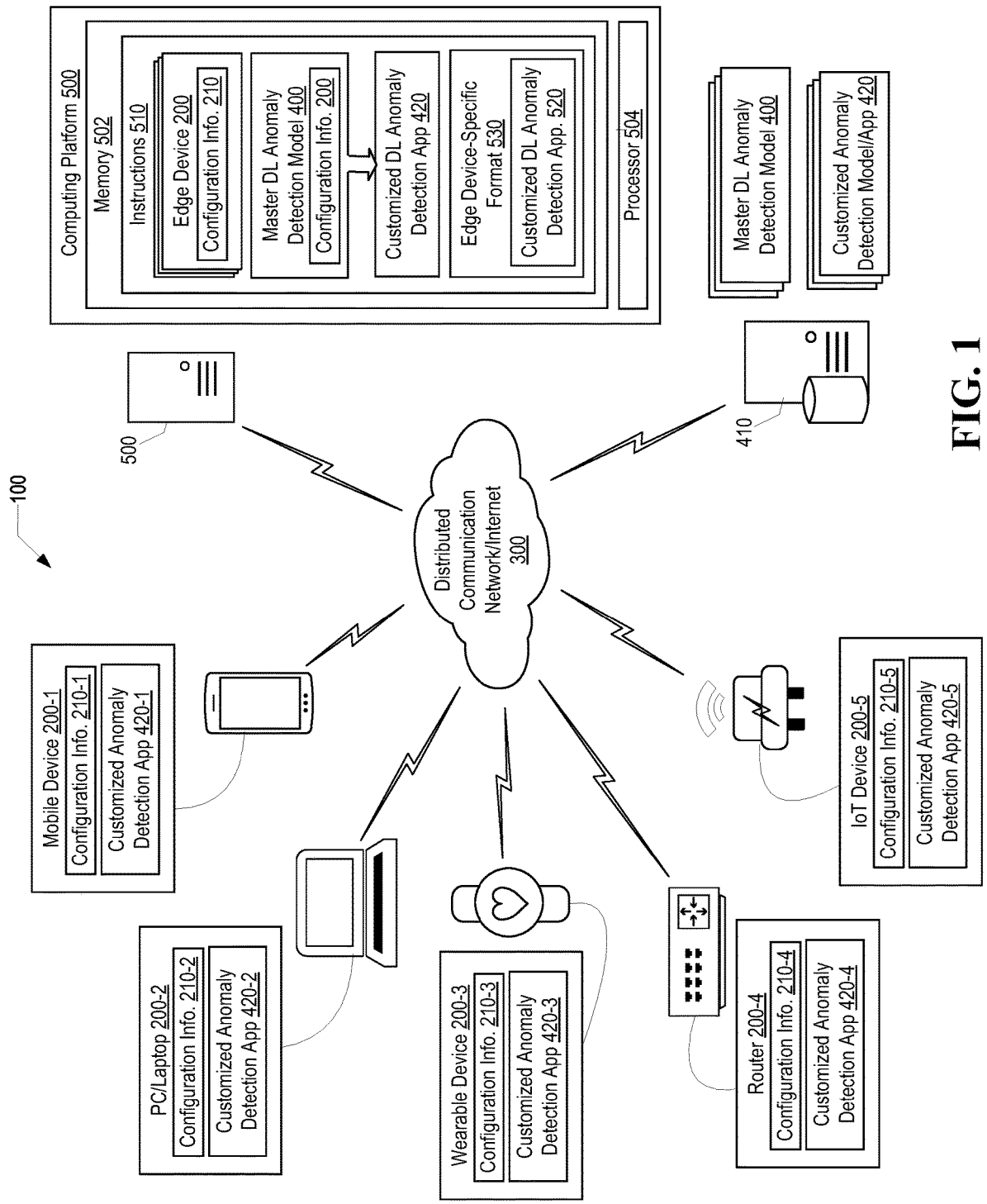
Figure 2:
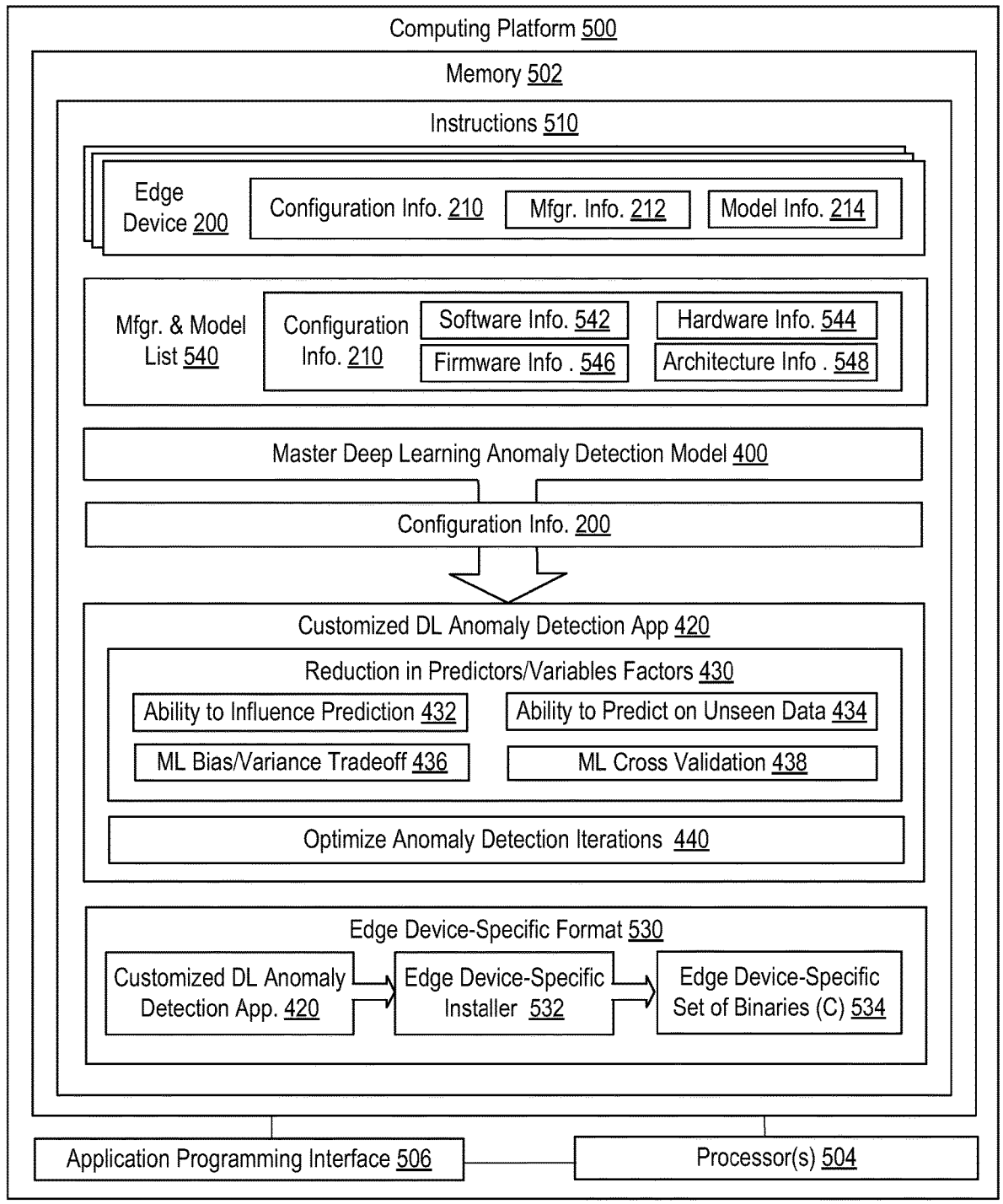
Figure 3:
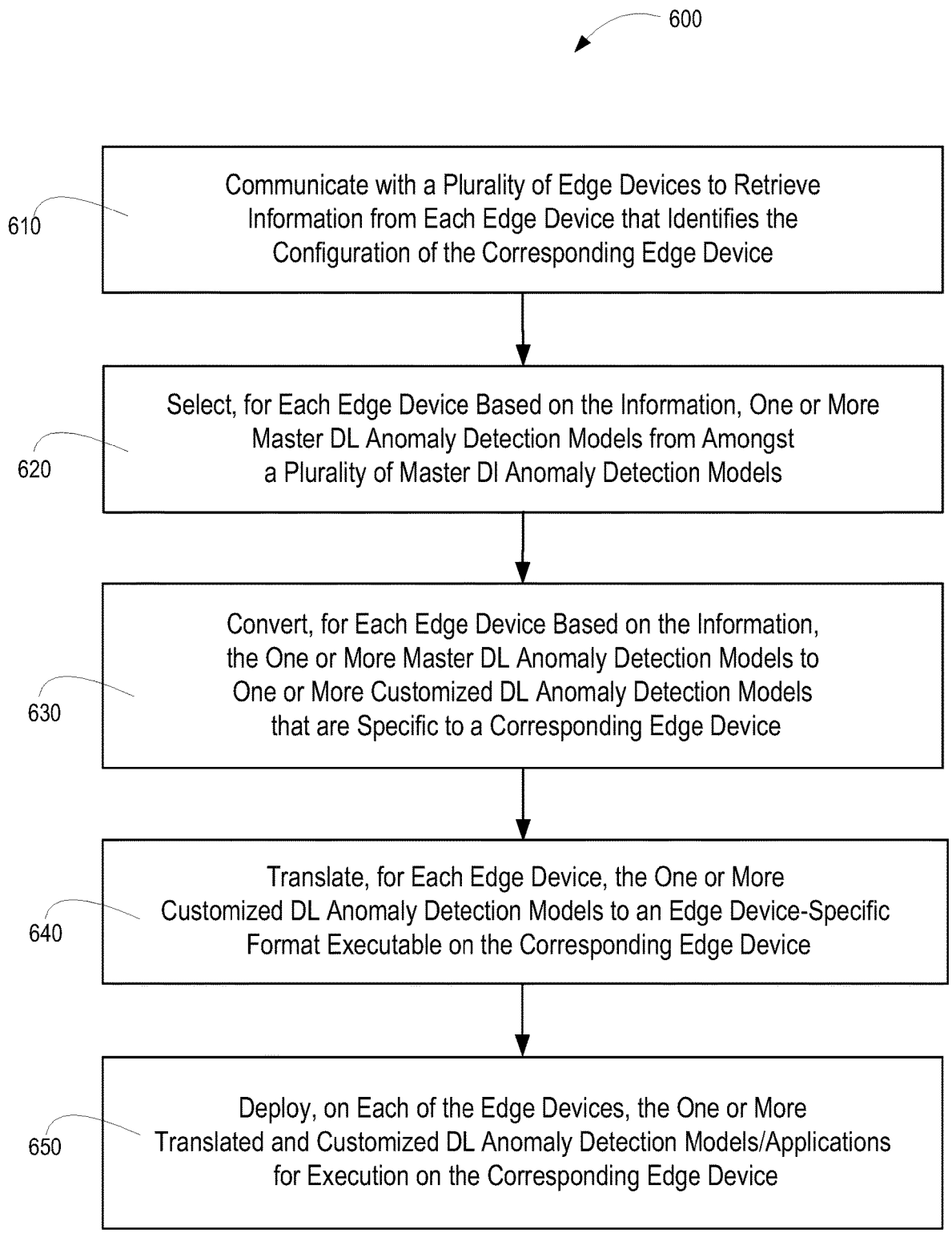

Having thus described embodiments of the disclosure in general terms, reference will now be made to the accompanying drawings, wherein:

FIG. 1 is a schematic diagram of a system for generating and deploying customized Deep Learning (DL) anomaly detection models/applications on edge devices, in accordance with embodiments of the present invention;

FIG. 2 is a block diagram of computing apparatus configured for generating and deploying customized DL anomaly detection models/applications on edge devices, in accordance with some embodiments of the present disclosure; and FIG. 3 is a flow diagram of a method generating and deploying customized DL anomaly detection models/applications on edge devices, in accordance with embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatus. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer-implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, systems, computer-implemented methods, computer program products and the like, which are described in more detail below, provide for generating and deploying customized DL anomaly detection models on disparate edge devices. Specifically, the present invention provides for retrieving configuration-related information from edge devices and, based on the information, selecting at least one primary DL anomaly detection model which is then converted (i.e., customized) based on the configuration/capabilities of the specific edge device. Customization includes, but is not limited to, reducing the volume of variables/predictors from the primary anomaly detection models and optimizing processing iterations for identifying anomalies. Reducing the volume of variables/predictors may include selecting only those variables/predictors that influence an outcome/prediction and provide a requisite level of predictions when encountering previously unknown data. Iterations may be optimized by limiting variables/predictors to only those that do not require external data (i.e., network communication with a cloud node or a data center/server). The resulting customized model is a pared-down, so called "lightweight" version of a primary anomaly detection model.

Once the anomaly detection models have been customized, the model(s) are translated into an edge device-specific formats. For example, the customized DL anomaly detection is packaged as an edge device-specific set of binaries in C programming language, which are subsequently deployed on the edge device. The customized DL anomaly detection applications are capable of being executed on the edge device without the need for specialized hardware and without the need to retrieve data or otherwise communicate with network resources (e.g., data centers servers, cloud nodes or the like). As result, the customized DL anomaly detections application, which rely solely on attribute data generated locally at the edge device, is capable of providing faster anomaly detection and/or anomaly-related predictions.

Referring to FIG. 1, a schematic diagram of a system 100 for generating and deploying customized Deep Learning (DL) anomaly detection models/applications on edge devices, in accordance with embodiments of the present invention. The system 100 includes a plurality of edge devices 200 that are deployed throughout a distributed communication network 300, such as the Internet, one or more intranets, including local area networks (LANs), wide area networks (WANs), cloud networks and the like. The edge devices 200 are any device at the periphery of the distributed computing network 300 that is capable of generating and/or gathering data. As shown in FIG. 1, by way of example only, the edge devices 200 include mobile device 200-1, such as a smart telephone; personal computer (PC) or laptop 200-2; wearable device 200-3, such as a smart watch; router 200-4, and Internet-of-Things (IoT) device 200-5.

The system additionally includes one or more primary Deep Learning (DL) anomaly detection models 400, which may be stored at a database/data repository 400 or any other network-accessible location. For example, in specific embodiments the primary DL anomaly detection models 400 may comprise Generative Adversarial Network (GAN)-based anomaly detection models, which rely on deep learning methodologies, such as convolutional neural networks or the like. Such modeling is an unsupervised learning task in machine learning that involves automatically discovering and learning the regularities or patterns in input data in such a way that the model can be used to generate or output new predictions (i.e. examples that plausibly could be drawn from the original dataset). However, the primary DL anomaly are typically computationally complex and require retrieval of data from a data center/server or a cloud node as a means of generating/outputting the predictions. Such GAN-based anomaly detection models are difficult to train for a specific use case (i.e., a specific edge device) and are not readily conducive to be implemented on low resource devices, such as some wearable device, IoT devices or the like.

The system additionally includes a computing platform 500, such as server or the like, disposed within the distributed communication network 200. The computing platform 500 includes a memory 502 and at least one processor 504 in communication with the memory 502. The memory 502 stored instructions 510 that are executable by the one or more processors 504. The instructions 510 are configured to communicate with the edge devices 200 to retrieve configuration information 210 from each of the edge devices 200 (e.g., edge device 200-1-200-5) that identifies the type of device and the capabilities of the edge device in terms of software, hardware, firmware, architecture of the edge device.

The instructions 510 are further configured to select, for each of the edge devices 200 based on the configuration information 210, at least one of the primary DL anomaly detection models 410. For example, the primary DL anomaly detection models may be specific to (or more applicable to) a device type or the type of data that is being generated/collected by the edge device 200. Once the primary DL anomaly detection model(s) have been selected, the instructions 510 are configured to convert, for each of the edge devices 200 based on the configuration information 210, the one or more primary DL anomaly detection models 400 to a customized DL anomaly detection model/application 420. The customized DL anomaly detection model/application 420 is a pared-down version, otherwise referred to as a lightweight version, of the primary DL anomaly detection model 400. In this regard, the customized DL anomaly detection model application 420 includes a reduced volume of predictors/variables and provides for optimization of the processing iterations used to make a prediction. For example, the instructions 510 are configured to determine which of the predictors/variables are the strongest influence on an outcome/prediction (i.e., meet a predetermined predictor threshold level) and/or which predictors/variables provide a requisite predetermined level of prediction when encountering new (i.e., previously unseen) data. Other factors that the instructions 510 consider in determining the strongest predictors/variables are the machine learning techniques of the predictor/variable, including, but not limited to, bias/variance tradeoff, cross validation and the like.

Once the customized DL anomaly detection models/applications 420 have been generated, the instructions 510 are further configured to translate the customized DL anomaly detection models/applications into an edge device-specific format that is executable on a corresponding edge device. For example, in specific embodiments of the invention, the instructions 510 are configured to package the customized DL anomaly detection model/application 420 as a set of edge device specific binaries, such as C language binaries. In response to translating the customized DL anomaly detection model/applications 420, the instructions 510 are configured to deploy/communicate the customized DL anomaly detection models/applications 420 to their respective edge devices 200 for subsequent execution on the edge devices 200.

It should be noted that in specific embodiments of the system, the lightweight customized DL anomaly detection application/models 420 are executed on the edge device 200 without having to retrieve data or otherwise communicate with data center(s)/sever(s) or cloud node(s). In addition, the customized DL anomaly detection application/models 420 are executed on the edge devices 200 absent a requirement for specialized hardware. As result, the customized DL anomaly detection models/applications 420 rely on data/attributes generated or captured on the edge device itself and, therefore, the speed of the inferences/predictions made by the customized applications is greatly improved over traditional GAN models/applications.

Referring to FIG. 2, a block diagram is shown of a computing platform 500 for generating and deploying customized DL anomaly detection models/applications on edge devices, in accordance with various embodiments of the present invention. In addition to providing greater detail, FIG. 2 highlights various alternative embodiments of the invention. The computing platform 500 may comprise one or typically more computing devices (e.g., servers or the like) and is configured to execute engines, including algorithms, modules, routines, applications and the like. Computing platform 500 includes memory 502 and the like which may comprise volatile and non-volatile memory, such as read-only and/or random-access memory (RAM and ROM), EPROM, EEPROM, flash cards, or any memory common to computing platforms). Moreover, memory 502 and the like may comprise cloud storage, such as provided by a cloud storage service and/or a cloud connection service.

Further, computing platform 500 also includes at least one processing device 504, or the like which may be an application-specific integrated circuit ("ASIC"), or other chipset, logic circuit, or other data processing device configured to implement artificial intelligence including machine learning techniques. Processing device(s) 504 or the like may execute one or more application programming interface (APIs) 506 that interface with any resident programs, such as instructions 510 or the like stored in the memory 502 of the computing platform 500 and any external programs. Processing device(s) 504 may include various processing subsystems (not shown in FIG. 2) embodied in hardware, firmware, software, and combinations thereof, that enable the functionality of the computing platform 500 and the operability of the computing platform 500 on the distributed communications network 300 (shown in FIG. 1). For example, processing subsystems allow for initiating and maintaining communications and exchanging data with other networked devices, such as edge devices 200 (shown in FIG. 1). For the disclosed aspects, processing subsystems of computing platform 500 may include any processing subsystem used in conjunction with instructions 510 and related engines, tools, routines, sub-routines, algorithms, sub-algorithms, sub-modules thereof.

Computing platform 500 may additionally include a communications module (not shown in FIG. 2) embodied in hardware, firmware, software, and combinations thereof, that enables electronic communications between the computing platform 500 and other network devices, such as, but not limited to, edge devices (shown in FIG. 1). Thus, communication module may include the requisite hardware, firmware, software and/or combinations thereof for establishing and maintaining a network communication connection with one or more network devices.

Memory 502 of computing platform 500 stores instructions 510 that are configured to generate and deploy customized DL anomaly detection applications/models to edge devices, in accordance with embodiments of the invention.

Instructions 510 are configured to communicate with edge device 200 to retrieve configuration information 210 that identifies configuration/capabilities of a corresponding edge device 200. In specific embodiments, instructions 510 are configured to query the edge devices 200 for manufacturer information 212, model information 214 and in some embodiments serial number or the like. In repose to retrieving/fetching the manufacturer information 212 and model information 214, instructions 510 are configured to access a manufacturer and model listing 540 that lists configuration information 210 based on manufacturer and model and, in some embodiments serial number or serial number range. The configuration information 210 included in the manufacturer and model listing 540 may include, but is not limited to, software information 542, hardware information 544 (e.g., sensors and the like), firmware information 546, architecture information 548 and the like. It should be noted that in specific embodiments of the invention, the instructions 510 may receive a listing of edge devices 200 requiring one or more customized DL anomaly detection application(s) 420. In other embodiments of the invention, instructions 510 may be configured to identify edge devices 200 that require one or more customized DL anomaly detection applications 420. For example, edge devices 200 that interact with the entity deploying the customized DL anomaly detection application may be identified by an Internet Protocol (IP) or the like. In the specific example, in which, the customized DL anomaly detection applications are deployed by an entity associated with financial transactions (e.g., financial institution or the like) the IP addresses of edge devices used in conducting such transactions may used to identify devices requiring customized DL anomaly detection applications.

In response to retrieving or otherwise determining edge device 200 configuration information 210, instructions 510 are configured to select, for each of the edge devices 200 based on the configuration information 210, one or more of the primary DL anomaly detection models 400. In specific embodiments of the invention, the primary DL anomaly detection model 400 is a Generative Adversarial Network (GAN)-based model, which is a deep learning algorithm that typically relies on data available in the public domain to make predictions/inferences. As such, these GAN-based models are computationally complex. In certain embodiments of the invention primary DL anomaly detection models 400 may be specific to a device type and/or data type and, therefore a specific edge device 200 that is capable of generating and/or processing data of more than one data type may require more that more one primary DL anomaly detection models 400 be converted into more than one customized DL anomaly detection application/models 420.

In response to selecting the one or more primary DL anomaly detection models 400, instructions 510 are configured to convert, for each edge device 200 based on the configuration information 210, the one or more primary DL anomaly detection models 400 to one or more customized DL anomaly detection models 420. As previously discussed, the customized DL anomaly detection model/application 420 is a pared-down version, otherwise referred to as a lightweight version, of the primary DL anomaly detection model 400. In specific embodiments of the invention, transfer learning, which embodies machine learning techniques, is used to convert or train the primary DL anomaly detection model 400 to perform as a customized DL primary anomaly detection model 420. In specific embodiments of the invention, the customized DL anomaly detection model/application 420 includes a reduced volume of predictors/variables. In such embodiments of the invention, reduction in predictors/variables factors 430 are used to determine which predictors/variables should remain in the customized DL anomaly detection application 420 and which predictors/variables should be removed from the primary DL anomaly detection model 400. Such factors 430 may include, but are not limited to, (i) the ability of the predictor/variable to influence the prediction/inference 432 (stronger predictors/variable remain in the customized model, while weaker predictors/variables are removed), (ii) ability of the predictor/variable to predict based on previously unseen data 434, (iii) machine learning bias versus variance tradeoff 436 of a predictor/variable, and (iv) machine learning cross validation 438 of a predictor/variable. In addition, conversion of the primary DL anomaly detection model 400 to a customized DL anomaly detection model/application may include optimizing anomaly detection iterations/processing 440. Such optimization may include, but is not limited to, limiting the volume or frequency of iterations, requiring anomaly detection and/or predictions to occur absent network-based information (i.e., absent information from a data center or cloud) and the like.

In response to converting the primary anomaly detection model(s) to customized anomaly detection models/applications, the instructions 510 are configured to configured to translate the model to an edge device-specific format 530 that is executable by the corresponding edge device 200. In specific embodiment of the invention an edge-specific installer 532 is generated that is configured to prepare a customized edge device-specific set of binaries 534, such as C language binaries for the edge device 200. For example, if the edge device 200 is a PC, laptop or other device with Internet capabilities the end point deployment package may be a cross browser extension built using JavaScript, which is capable of functioning across multiple web browsers. If the edge device 200 is a wearable device, the end point deployment package may comprise a lightweight application and if the edge device 200 is mobile device, such as smartphone, the package may comprise a mobile application. Moreover, if the edge device 200 is PC or laptop with a conventional operating system, the package may comprise an operating system-level application and if the edge device 200 is a router or the like, the package may comprise executable C codes or the like. Each edge device will typically have an operating system (OS) or kernel. In those edge devices that do not include an OS or kernel, a stand-alone executable C code is generally executable with minimal resource requirements. As previously, more than one end point deployment package may be deployed to any one specific edge device 200 depending upon the capabilities/configuration of the edge device 200.

Once the customized end point deployment packages have been generated, the packages are deployed to their respective edge devices 200 for subsequent execution of the edge device 200. As previously noted, in specific embodiments of the invention, the customized DL anomaly detection applications/models are capable of being executed based on solely on data generated and/or captured locally on the edge device (i.e., without obtaining data from a data center, cloud or the like). As such, present invention is several times faster in determining anomalies and/or making predictions than models/applications which require network communication. Additionally, the since no network communication is required, the customized models/applications 420 can be executed and predictions made in the event the edge device does not have an Internet connection. In this regard, alerts/notifications of inferences/predictions can be displayed on the edge device when the edge device is not connected to the Internet or connected to any other device. Moreover, the lightweight aspect of the customized models/applications means that the models/applications can be executed without the edge devices being configured with specialized hardware.

In a specific use case, the customized DL anomaly detection application is deployed to a wearable device, such as a smart watch. A smart watch is typically configured to monitor/analyze various predictors/variables, such as cardio rate, electrocardiogram (EKG), oxygen saturation (SPO2) or the like. The customized DL anomaly detection application 420 is configured to analyze these predictors, determine the occurrence of anomalies (e.g., cardio rate and/or SPO2 above a threshold or the like, determine an inference/prediction based on the occurrence of the anomalies and notify/alert the user (e.g., flashing lights, audible sound patterns, display information or the like). In another specific use case, the customized DL anomaly detection application 420 is deployed on a mobile device, such as smartphone for monitoring transactions via a cross browser extension that analyzes the variables of a transaction to predict whether or not the transaction is unauthorized or otherwise suspect. In the event the transaction is determined to be unauthorized or suspect, an alert is generated and displayed, audiblized or visualized on the mobile device. The alert/notification may be configured for the user to provide additional authentication mechanisms, such as, but not limited to, text captcha, image captcha, out-of-pocket security questions or the like. By determining transactions that might be suspect and requiring the user to provide further authentication to proceed, the present invention lessens the likelihood of false positives (i.e., preventing transactions that may be suspect but can be authenticated as being authorized). In the event that mobile device is connected to another device (via short-range wireless communication or the like), the alert/notification may be communicated to the other device and displayed or otherwise outputted on the connected device.

Referring to FIG. 3 a flow diagram is depicted of a method 600 for generating and deploying customized DL anomaly detection models/application on edge devices, in accordance with embodiments of the present invention. At Event 610, edge devices are communicated with to retrieve information from the devices that identifies the configuration of the edge device. In specific embodiments of the invention, queries are sent to the edge devices to fetch the make/manufacturer, model and/or serial number of the device and compared to a primary listing of make and model numbers which specifies the configuration of the make and model (e.g., software, hardware, firmware, architecture and the like that defines the capabilities of the device).

In response to fetching the information and determining the edge devices' configuration information, at Event 620, one or more primary DL anomaly detection models are selected for each of the edge devices based at least on the configuration information. As previously discussed, the primary DL Anomaly detection may be specific to device type and/or data type.

In response to selecting one or more primary DL anomaly detection modules, at Event 630, for each edge device and based on the configuration information, the primary DL anomaly detection models are converted to customized DL anomaly detection models that are specific to a corresponding edge device. Transfer learning may be used to convert the pre-built primary DL anomaly detection models to customized DL anomaly detection models/applications to be implemented for specific objectives on edge devices. As previously discussed, the customized DL anomaly detection application/model will be a pared-down/lightweight version of the primary, in which, predictors/variables are reduced depending on their ability to predict an outcome and other factors. In addition, the customized DL anomaly detection application/model is configured to optimize the anomaly detection and prediction iterations, so as to eliminate external network communication and speed up the overall prediction/inference process.

In response to converting the primary DL anomaly detection models to customized DL anomaly detection models, at Event 640, the customized models are translated to a format that is executable by the corresponding edge device. In specific embodiments an edge device-specific installer is built and implemented to convert/translate the model to a set of binaries, such as C language binaries or the like. The deployment package is dependent upon the type of device and the configuration of the device. As such, the deployment package may include, but id not limited to, cross browser extensions, mobile applications, operating system-level programs, executable C codes and the like.

In response to translating the customized applications/models to edge device-specific deployment packages, at Event 650, the deployment packages are deployed/communicated to their respective edge devices for subsequent execution on the edge devices. The customized applications are executed absent communication with external network resources, such as data centers/servers or cloud nodes and without the need for specialized hardware.

Thus, present embodiments of the invention provide for generating and deploying customized DL anomaly detection models on disparate edge devices. Specifically, the invention fetches configuration-related information from the edge devices and, based on the configuration/capabilities of the edge device, selects one or more primary DL anomaly detection models which are then customized based on the configuration/capabilities of the edge device. Customization involves limiting the volume of the predictors/variables and optimizing the iterations used to determine anomalies and/or make predictions. Once the models have been customized the invention provides for packaging the customized models in edge device-specific formats, such as a customized set of binaries in C language or the like. The resulting customized DL anomaly detection application is subsequently deployed to the edge device where it is executable without the need for specialized hardware or communication with network entities, such as cloud nodes or servers. Thus, the resulting customized DL anomaly detection application is capable fully localized execution, in which, only those attributes captured on the edge device are used to determine anomalies and/or make predictions. The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating and deploying customized Deep Learning (DL) anomaly detection models on edge devices, the system comprising:
   a plurality of edge devices deployed throughout a distributed communication network;
   one or more primary DL anomaly detection models, each primary DL anomaly detection model configured to detect anomalies occurring at a device and make predictions based on the detected anomalies; and
   a computing platform including a memory and at least one processing device in communication with the memory, wherein the memory stores instructions, wherein the instructions are executable by the one or more processing devices and configured to:
      communicate with the edge devices to retrieve information from each edge device that identifies configuration of a corresponding edge device,
      select, for each of the edge devices based on the information, at least one primary DL anomaly detection model from amongst the one or more primary DL anomaly detection models,
      convert, for each of the edge devices based on the device configuration information, the selected the one or more primary DL anomaly detection models to one or more customized DL anomaly detection models that are specific to a corresponding one of the edge devices;
      translate, for each of the edge devices, the one or more customized DL anomaly detection models to a format executable on the corresponding one of the edge devices, and
      deploy, on each of the edge devices, the one or more translated and customized DL anomaly detection models for execution on the corresponding one of the edge devices.

2. The system of claim 1, wherein the one or more customized DL anomaly detection models are executed on the corresponding one of the edge devices to locally detect anomalies and locally provide predictions related to the anomalies absent network communication with a cloud network and a data center.

3. The system of claim 1, wherein the one or more customized DL anomaly detection models are executed on the corresponding one of the edge devices to locally detect anomalies and locally provide predictions related to the anomalies absent a requirement for implementing hardware on the corresponding one of the edge devices that is specifically designed for executing DL anomaly detection models.

4. The system of claim 1, wherein the instructions configured to communicate with the edge devices to retrieve information that identifies configuration of a corresponding edge device are further configured to:
   communicate with the edge devices to retrieve make and model information related to the corresponding edge device, and
   access a make and model listing to identify at least one of software, hardware, firmware and architecture information associated with the make and model information of the corresponding edge device.

5. The system of claim 1, wherein the instructions configured to convert, for each of the edge devices based on the device configuration information, the selected the one or more primary DL anomaly detection models to one or more customized DL anomaly detection models are further configured to:
   reduce a volume of predictors in the one or more primary DL anomaly detection models by selecting predictors based on at least one of (i) an ability to influence a prediction, (ii) providing a predetermined level of prediction when encountering previously unseen anomaly-detection related data, (iii) bias versus variance tradeoff, and (iv) an ability for cross validation.

6. The system of claim 1, wherein the instructions configured to convert, for each of the edge devices based on the device configuration information, the selected the one or more primary DL anomaly detection models to one or more customized DL anomaly detection models are further configured to optimize anomaly detection iterations in the one or more primary DL anomaly detection modules.

7. The system of claim 1, wherein the instructions configured to translate, for each of the edge devices, the one or more customized DL anomaly detection models to a format executable on the corresponding one of the edge devices are further configured to translate the one or more customized DL anomaly detection models to a customized set of binaries in C computing language.

8. The system of claim 7, wherein the instructions configured to translate, for each of the edge devices, the one or more customized DL anomaly detection models to a format executable on the corresponding one of the edge devices are further configured to build an edge device-specific installer that is configured to translate the one or more customized DL anomaly detection models to a customized set of binaries in C computing language.

9. The system of claim 1, wherein the plurality of edges devices comprise wearable communication devices, mobile communication devices, personal computing devices, and routers.

10. The system of claim 1, wherein the translated and customized DL anomaly detection models include cross browser extensions built using JavaScript, mobile applications, operating system-level applications and executable C codes.

11. A computer-implemented method for generating and deploying customized Deep Learning (DL) anomaly detection models on edge devices, the method executed by one or more computing device processors and comprising:
   communicating with a plurality of edge devices to retrieve information from each edge device that identifies configuration of a corresponding edge device;
   selecting, for each of the edge devices based on the information, at least one primary DL anomaly detection models from amongst one or more primary DL anomaly detection models;
   converting, for each of the edge devices based on the device configuration information, the selected the one or more primary DL anomaly detection models to one or more customized DL anomaly detection models that are specific to a corresponding one of the edge devices;
   translating, for each of the edge devices, the one or more customized DL anomaly detection models to a format executable on the corresponding one of the edge devices; and
   deploying, on each of the edge devices, the one or more translated and customized DL anomaly detection models for execution on the corresponding one of the edge devices.

12. The computer-implemented method of claim 11, wherein the one or more customized DL anomaly detection models are executed on the corresponding one of the edge devices to locally detect anomalies and locally provide predictions related to the anomalies absent (i) network communication with a cloud network and a data center, and (ii) a requirement for implementing hardware on the corresponding one of the edge devices that is specifically designed for executing DL anomaly detection models.

13. The computer-implemented method of claim 11, wherein communicating with the edge devices to retrieve information that identifies configuration of a corresponding edge device further comprises:
   communicating with the edge devices to retrieve make and model information related to the corresponding edge device; and
   accessing a make and model listing to identify at least one of software, hardware, firmware and architecture information associated with the make and model information of the corresponding edge device.

14. The computer-implemented method of claim 11, wherein converting, for each of the edge devices based on the device configuration information, the selected the one or more primary DL anomaly detection models to one or more customized DL anomaly detection models further comprises:
   reducing a volume of predictors in the one or more primary DL anomaly detection models by selecting predictors based on at least one of (i) an ability to influence a prediction (ii) providing a predetermined level of prediction when encountering previously unseen anomaly-detection related data, (iii) bias versus variance tradeoff, and (iv) an ability for cross validation; and
   optimizing anomaly detection iterations in the one or more primary DL anomaly detection modules.

15. The computer-implemented method of claim 11, wherein translating, for each of the edge devices, the one or more customized DL anomaly detection models to a format executable on the corresponding one of the edge devices further comprises:
   building an edge device-specific installer; and
   implementing the edge device-specific installer to translate the one or more customized DL anomaly detection models to a customized set of binaries in C computing language.

16. A computer program product comprising a non-transitory computer-readable medium including:
   a first set of codes for causing a computer processor to communicate with a plurality of edge devices to retrieve information from each edge device that identifies configuration of a corresponding edge device;
   a second set of codes for causing a computer processor to select, for each of the edge devices based on the information, at least one primary DL anomaly detection models from amongst one or more primary DL anomaly detection models;
   a third set of codes for causing a computer processor to convert, for each of the edge devices based on the device configuration information, the selected at least one primary DL anomaly detection models to one or more customized DL anomaly detection models that are specific to a corresponding one of the edge devices;
   a fourth set of codes for causing a computer processor to translate, for each of the edge devices, the one or more customized DL anomaly detection models to a format executable on the corresponding one of the edge devices; and
   a fifth set of codes for causing a computer processor to deploy, on each of the edge devices, the one or more translated and customized DL anomaly detection models for execution on the corresponding one of the edge devices.

17. The computer program product of claim 16, wherein the one or more customized DL anomaly detection models are executed on the corresponding one of the edge devices to locally detect anomalies and locally provide predictions related to the anomalies absent (i) network communication with a cloud network and a data center, and (ii) a requirement for implementing hardware on the corresponding one of the edge devices that is specifically designed for executing DL anomaly detection models.

18. The computer program product of claim 16, wherein the first set of codes is further configured to cause the computer processor to:
   communicate with the edge devices to retrieve make and model information related to the corresponding edge device, and
   access a make and model listing to identify at least one of software, hardware, firmware and architecture information associated with the make and model information of the corresponding edge device.

19. The computer program product of claim 16, wherein the third set of codes is further configured to cause the computer processor to:
   reduce a volume of predictors in the one or more primary DL anomaly detection models by selecting predictors based on at least one of (i) an ability to influence a prediction (ii) providing a predetermined level of prediction when encountering previously unseen anomaly-detection related data, (iii) bias versus variance tradeoff, and (iv) an ability for cross validation; and
   optimize anomaly detection iterations in the one or more primary DL anomaly detection modules.

20. The computer program product of claim 16, wherein the fourth set of codes is further configured to:
   build an edge device-specific installer; and
   implement the edge device-specific installer to translate the one or more customized DL anomaly detection models to a customized set of binaries in C computing language.

* * * * *